Aug. 27, 1957  T. S. ZWIERCAN  2,803,915
FISH LURE
Filed Jan. 3, 1955
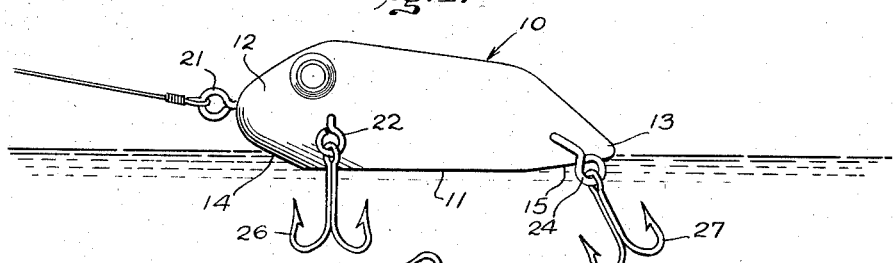
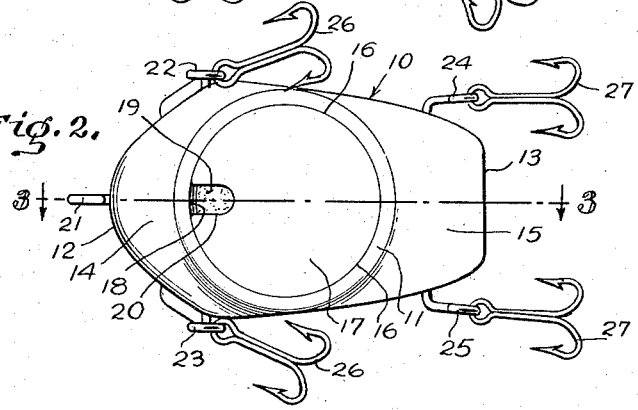
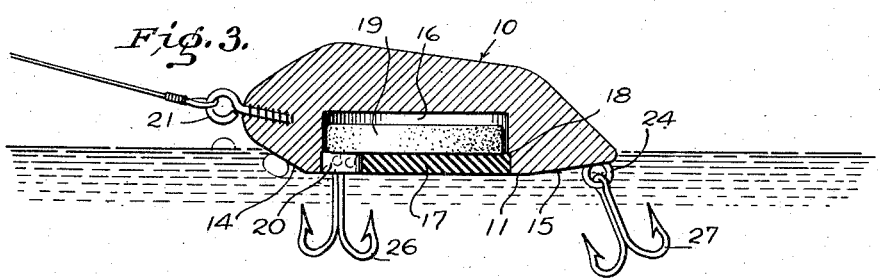
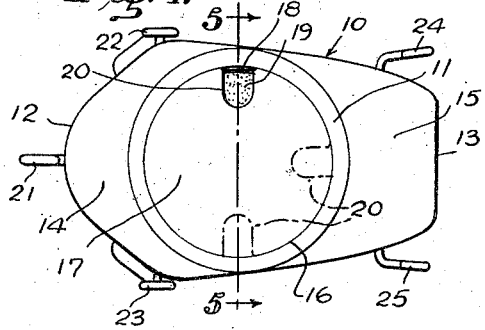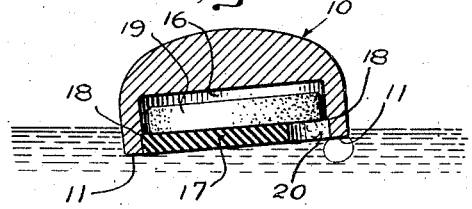
INVENTOR.
Theodore S. Zwiercan
BY
Reginald W. Hoagland
ATTORNEY United States Patent Office 2,803,915
Patented Aug. 27, 1957

2,803,915

FISH LURE

Theodore S. Zwiercan, Flint, Mich.

Application January 3, 1955, Serial No. 479,536

2 Claims. (Cl. 43—42.06)

The present invention relates to artificial lures for use in fishing and aims to provide a novel and improved device of this character which simulates a live fish food and which produces motion, sound, and the expulsion of gas or air for the purpose of attracting fish.

The principal object of the invention is to provide a fish lure, and more particularly, a surface lure with means therein for creating and expelling gas bubbles at spaced intervals beneath the lure which make popping sounds when they rise to the surface of the water and burst, and which, because of their buoyancy and their direction of travel to the surface, produce motion to the lure.

Another object of the invention is to provide, in a device of the character set forth, a novel adjustable construction for changing the location of the expulsion of bubbles relative to the lure and thereby produce different motions to the lure indicative of the physical condition of the live food which is imitated.

A further object of the invention is to provide a fish lure in accordance with the preceding objects which is simple in construction, inexpensive to manufacture, and yet effective and efficient in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a side elevation of the improved lure;

Figure 2 is a bottom plan thereof;

Figure 3 is a vertical longitudinal section taken on line 3—3 of Figure 2;

Figure 4 is also a bottom plan with the hooks removed and showing in both full lines and dash and dot lines different positions of the opening through which gas or air is emitted; and, Figure 5 is a cross section taken on line 5—5 of Figure 4.

Referring now more specifically to the accompanying drawings wherein like numerals designate similar parts throughout the various views, the numeral 10 indicates generally the main body portion of the lure, which in the present instance, is representative of the body and head of a frog. There is, however, a slight difference in its shape from that of a frog, which is necessitated in order to provide a relatively large circular flat bottom surface 11 which has a diameter substantially equal to the width of the body and beyond which both the head portion 12 and tail portion 13 project and have their undersurfaces slightly inclined upwardly, as at 14 and 15, as they extend forwardly and rearwardly, respectively.

The body portion 10 may be made of any suitable buoyant material, either cut or molded to size and shape, and is provided centrally in its flat circular bottom 11 with a cylindrical cavity 16 which has a diameter slightly less than the diameter of the bottom surface and which is partially closed by a removable disc 17 pressed into said cavity. There is a slight shoulder 18 on the cylindrical wall of the cavity 16 upon which the disc 17 is seated upon alignment of the outer flat surface of said disc flush with the bottom surface 11, thus providing a compartment into which is placed a capsule 19 of a substance which emits gas upon contact with water. The disc 17 is constructed of relatively hard rubber or other slightly resilient non-buoyant material for yieldably engaging the surface of the cavity to retain said disc in place and for aiding in the floating of the lure right side up when casting said lure upon the water.

There is a notch 20 in the periphery of the disc 17 through which water may enter into the cavity 16 for contact with the capsule and through which gases generated by said capsule can escape. By positioning the notch forwardly of the lure, as shown in Figure 2, the gas bubbles emitting through the notched opening will take the shortest path to the surface of the water, thus, they will rise from beneath the nose portion 12 of the lure and impart a slight elevation of said nose portion, due to their buoyancy, as each bubble is emitted. This movement of the lure simulates a slow swimming, or a feeding frog. In full lines in Figures 4 and 5, the notch is shown as positioned to one side of the lure which will produce a side rocking motion to the lure which simulates a wounded or crippled frog. The dash and dot lines in Figure 4 also indicate other positions in which the notch 20 may be arranged for imparting other motions to the lure. In all positions of the notch, it will be observed that the same amount of flat bottom surface 11 is present under which the gas bubbles must travel to reach the surface of the water.

To the nose of the head portion 12, an eye 21 is secured by which the lure may be attached to a line. Also, there is a pair of forward eyes 22 and 23 and another pair of rearward eyes 24 and 25 secured to and arranged in opposite sides of said body portion. To each of the forward eyes 22 and 23 are attached multiple hooks 26 for simulating the forward legs of a frog, while to each of the eyes 24 and 25 are attached other multiple hooks 27 that simulate the rear legs of a frog.

From the foregoing description, it can be seen that there is provided a surface lure that need not be retrieved in order to impart motion thereto, and that by adjustment of the location of the peripheral notch 20 in the closure disc 17 relative to different sides and ends of the lure, different physical conditions of a live bait can be imitated. Further, it should be observed that the lure is constructed to normally float on the surface of water with the flat circular bottom 11 parallel to and slightly spaced below the water surface thereby providing a construction that aids the adjustable feature in imparting different motions to the lure. Also during motion of the body portion, the freely movable hanging hooks 26 and 27 will swing relative to the body portion, thus giving the appearance that the frog being imitated is moving his legs.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An artificial fish lure comprising an elongated body member of buoyant material and having a circular flat bottom portion intermediate its ends of a diameter substantially equal to its width and arranged substantially on a horizontal plane, said body member having the undersurfaces thereof both forwardly and rearwardly of said circular flat bottom portion inclined upwardly as they extend away from said circular flat bottom portion, said body member also having a cylindrical cavity of slightly less diameter than the diameter of said circular flat bottom and extending upwardly therein and concentrically bounded by said circular flat bottom portion, said cavity being adapted to receive a substance capable of emitting gas upon contact with water, and a rotatable closure element for said cavity and having an opening therethrough at a side portion thereof which provides a passageway that communicates said cavity in said body with the exterior of said body and at a location to one side of the center of said circular bottom portion, said body portion being constructed so as to float on the surface of the water with the circular bottom portion submerged beneath the surface of the water and substantially parallel therewith.

2. An artificial fish lure as defined in claim 1, wherein the location of the passageway communicating the cavity with the exterior of the body portion is adjustable to different sides of said body portion by rotating said closure element.

References Cited in the file of this patent

UNITED STATES PATENTS

| | | |
|---|---|---|
| 2,171,372 | Peck | Aug. 29, 1939 |
| 2,274,596 | Fink | Feb. 24, 1942 |
| 2,383,246 | Fiskaali | Aug. 21, 1945 |
| 2,683,325 | Sharp | July 13, 1954 |
| 2,716,830 | Burden | Sept. 6, 1955 |